(12) United States Patent
Stählin et al.

(10) Patent No.: US 9,702,964 B2
(45) Date of Patent: Jul. 11, 2017

(54) VALIDATION OF POSITION DETERMINATION

(75) Inventors: Ulrich Stählin, Eschborn (DE); Robert Gee, Lake Barrington, IL (US); Marc Menzel, Marburg (DE)

(73) Assignee: Continental Teves AG & Co. oHG, Frankfurt (DE)

( * ) Notice: Subject to any disclaimer, the term of this patent is extended or adjusted under 35 U.S.C. 154(b) by 597 days.

(21) Appl. No.: 13/124,278

(22) PCT Filed: Oct. 14, 2009

(86) PCT No.: PCT/EP2009/063430
§ 371 (c)(1),
(2), (4) Date: Nov. 4, 2011

(87) PCT Pub. No.: WO2010/043658
PCT Pub. Date: Apr. 22, 2010

(65) Prior Publication Data
US 2012/0053888 A1    Mar. 1, 2012

(30) Foreign Application Priority Data

Oct. 15, 2008  (DE) .......................... 10 2008 051 766
Oct. 22, 2008  (DE) .......................... 10 2008 043 040

(51) Int. Cl.
*G01S 5/02*    (2010.01)
*G01S 19/10*   (2010.01)
*G01S 19/48*   (2010.01)

(52) U.S. Cl.
CPC ............. *G01S 5/021* (2013.01); *G01S 19/10* (2013.01); *G01S 19/48* (2013.01)

(58) Field of Classification Search
CPC ........................................................ G01S 5/021
USPC ..................... 702/150; 342/357.2; 340/435
See application file for complete search history.

(56) References Cited

U.S. PATENT DOCUMENTS

| | | | |
|---|---|---|---|
| 5,490,079 A | 2/1996 | Sharpe | |
| 6,662,108 B2* | 12/2003 | Miller et al. | 701/301 |
| 7,382,274 B1* | 6/2008 | Kermani et al. | 340/901 |
| 2002/0098851 A1 | 7/2002 | Walczak | |
| 2004/0138812 A1 | 7/2004 | Cho | |
| 2005/0134440 A1* | 6/2005 | Breed | 340/435 |

(Continued)

FOREIGN PATENT DOCUMENTS

EP    1089088 A    4/2001

OTHER PUBLICATIONS

Hontani, H. et al., "Vehicle Positioning Method with Car-to-Car Communications in Consideration of Communication Delay," Networked Sensing Systems, 2008, INSS 2008, 5th International Conference on Jun. 17-29, pp. 219-222.

(Continued)

*Primary Examiner* — Ricky Ngon
(74) *Attorney, Agent, or Firm* — RatnerPrestia

(57) ABSTRACT

External position data, which are transmitted to the vehicle by infrastructural devices or adjacent vehicles, are used for validating or improving the measured vehicle position. As well, these data can be used for calculating the position of the vehicle itself without a satellite navigation receiver having to be provided for this purpose in the vehicle. The position determination can be improved further via a corresponding statistical evaluation.

15 Claims, 1 Drawing Sheet

(56) References Cited

U.S. PATENT DOCUMENTS

2006/0149475 A1* 7/2006 Kellum ................... G01S 11/06
                                                                             701/300
2009/0271112 A1* 10/2009 Basnayake ............. G08G 1/161
                                                                             701/469
2011/0140950 A1* 6/2011 Andersson ...................... 342/32

OTHER PUBLICATIONS

Kukshya, V. et al., "Design of a System Solution for Relative Positioning of Vehicles Using Vehicle-to-Vehicle Radio Communications During GPS Outages," Vehicular Technology Conference, 2005, VTC-2005-Fall, 2005 IEEE 62nd, vol. 2, pp. 1313-1317.

Parker, R. et al., "Cooperative Vehicle Position Estimation," Communications, 2007, ICC'07, IEEE International Conference, pp. 5837-5842.

Parker, R. et al., "Robust Min-Max Localization Algorithm," Intelligent Transportation Systems Conference, 2006, ITSC'06, IEEE, pp. 1000-1005.

Saito, T. et al., "Automobile Navigation System Using Beacon Information," Vehicle Navigation and Information Systems Conference, 1989. Conference Record Toronto, On., Canada Sep. 11-13, 1989, New York, NY, USA, IEEE, US, Sep. 11, 1989, pp. 139-145.

International Search Report for PCT/EP2009/063430 mailed Mar. 19, 2010.

German Search Report for DE 10 2009 045 709.7 dated Oct. 14, 2009.

\* cited by examiner

VALIDATION OF POSITION DETERMINATION

CROSS REFERENCE TO RELATED APPLICATIONS

This application is the U.S. national phase application of PCT International Application No. PCT/EP2009/063430, filed Oct. 14, 2009, which claims priority to German Patent Application No. 10 2008 051 766.6, filed Oct. 15, 2008, and German Patent Application No. 10 2008 043 040.4, filed Oct. 22, 2008, the contents of such applications being incorporated by reference herein.

FIELD OF THE INVENTION

The invention relates to the position determination in vehicles. In particular, the invention relates to a position determination device for a vehicle, a driver assistance system with a position determination device, an emergency call device with a position determination device, a vehicle, a method, a program element and a computer-readable medium.

BACKGROUND OF THE INVENTION

In vehicles, position determination devices such as satellite navigation receivers are often used for determining a position. The position data of the vehicle determined in this manner can then be used, for example, for navigation devices for vehicle navigation. The navigation devices are permanently installed in the vehicle or can be arranged as mobile units in the vehicle.

In today's systems, the GPS signal is often accepted as given. To improve the accuracy of a position signal which is determined from GPS data, differential GPS (DGPS) can be used, for example.

If the vehicle position thus obtained is used by a driver assistance system or a safety system, these systems must often assume, for safety reasons, that the position is inaccurate. This is the case particularly when the satellite reception is disturbed. An inaccurate position determination is also disadvantageous if an automated emergency call containing the vehicle position is to be initiated.

SUMMARY OF THE INVENTION

It is an object of the invention to improve the determination of a position of the vehicle and, at the same time, to increase the accuracy of the position determination.

A position determination device for a vehicle, a driver assistance system with a position determination device, an emergency call device with a position determination device, a vehicle with a position determination device, a method for position determination for a vehicle, a program element and a computer-readable medium according to the features of the independent patent claims are specified. Developments of the invention are obtained from the subclaims.

The exemplary embodiments described relate in equal measure to the position determination device, the driver assistance system, the emergency call device, the vehicle, the method, the program element and the computer-readable medium. In other words, for example, features which are described with regard to the position determination device in the text which follows, can also be implemented as method steps in the method, the program element or the computer-readable medium, and conversely.

According to an exemplary embodiment of the invention, a position determination device for a vehicle is specified which has a position determination unit, a communication unit and a control unit. The position determination device is constructed for determining a position of the vehicle. The communication unit is constructed for receiving validation data which, for example, are transmitted by one or more external transmitters (infrastructural devices or adjacent vehicles). The control unit is used for carrying out a validation of the position determined by the position determination unit on the basis of the received validation data.

In other words, the position determination device can determine the position of its own vehicle in a first step, for example by using a satellite navigation receiver, possibly in combination with measurement data of a vehicle sensor system or, for example, also by measurements in cells in a mobile radio network.

In a subsequent step, validation data are received in the vehicle and the calculated vehicle position is checked with the aid of these validation data and validated and possibly improved further.

If the validation is not successful, the vehicle position previously determined can be changed with the aid of the validation data so that the accuracy of the position is increased. As well, the vehicle position previously determined can be discarded as measurement error in which case a new measurement takes place and/or only the validation data are used for determining the vehicle position.

The vehicle position thus obtained can then be used for vehicle navigation together with a digital map of the vehicle and/or for a driver assistance system, safety system or for initiating a digital emergency call.

The term "digital maps" is also understood to include maps for advanced driver assistance systems (ADAS) without any navigation taking place.

The vehicle is, for example, a motor vehicle such as a car, bus or truck or also a rail vehicle, a ship, an aircraft such as a helicopter or airplane or, for example, a bicycle.

Furthermore, it should be pointed out that in the context of the present invention GPS is representative for all global navigation satellite systems (GNSS) such as, e.g. GPS, Galileo, GLONASS (Russia), Compass (China), IRNSS (India).

It should also be pointed out at this point that the transmission of data within the vehicle can take place in a cable-connected manner. As an alternative or additionally to this, it can also be provided that the vehicle-internal data transmission is cableless, at least partially. In this case, corresponding cableless communication interfaces are provided via which the individual assemblies can communicate with one another. For example, the position determination unit can be a mobile device, for example a mobile telephone.

As already presented above, the position determination of the vehicle can also take place alternatively or additionally to the position determination via a satellite position determination system via cell positioning. This is available particularly when using GSM, UMTS or LTE networks, and in WiMax networks.

According to another exemplary embodiment of the invention, the validation data which are transmitted from the external place to the vehicle are position data of an adjacent vehicle and/or of an adjacent infrastructural device.

It is possible to receive a multiplicity of different position data from different infrastructural devices and vehicles, all of which are then evaluated and can be included in the validation (if a certain record is not discarded due to an obvious measurement error or, for example, due to an obvious data misuse).

According to a further exemplary embodiment of the invention, the validation data are transmitted by means of vehicle-to-vehicle communication or vehicle-to-infrastructure communication.

According to a further exemplary embodiment of the invention, the position determination unit is integrated in a mobile device.

As well, a number of position determination units can be provided in the vehicle, for example one in a mobile telephone and another permanently installed unit in the vehicle.

One of these devices can be selected as basic device and the data of the remaining devices can be utilized for validating the position data of the basic device.

According to a further exemplary embodiment of the invention, the control unit resorts to measurement data of a sensor or of a complete sensor system of the vehicle for carrying out the validation of the position determined by the position determination unit.

For example, environmental sensor data from radar or lidar sensors or cameras or also other measurement data (speed, steering angle history etc.) can be used for this purpose.

According to a further exemplary embodiment of the invention, the position determination unit comprises a satellite navigation receiver.

According to a further exemplary embodiment of the invention, the position determination device is furthermore constructed for initiating an automated emergency call. The emergency call contains position information which is only based on the received validation data if the validation of the vehicle position (determined by the vehicle itself) has failed.

In other words, if the validation is not successful because the position determined by the vehicle is graded as inappropriate, an automated emergency call can resort to a position data of the adjacent vehicles and/or infrastructural devices. In this manner, it is possible to ensure that an automated emergency call will always contain position information even if the vehicle itself cannot deliver sensible position information.

According to a further exemplary embodiment of the invention, the communication unit is a wireless access and drive authorization unit ("ignition key") of the vehicle.

A permanently installed communication unit is not necessary.

According to a further exemplary embodiment of the invention, the control unit is constructed for calculating the position of the vehicle by using external position data which have been generated by an infrastructural device or an adjacent vehicle.

In other words, this position data transmitted from an external place can be used not only for validating and/or improving the vehicle position determined on the basis of the vehicle's own internal position determination unit but also alternatively for the actual position determination without having to use data of the vehicle-internal position determination unit for this purpose.

At this point, it should be pointed out explicitly that the invention contains two aspects: A first aspect consists in that the position data determined in the vehicle with the aid of the vehicle-internal position determination unit are validated and/or improved, in that position data from external units are utilized for this purpose. Another aspect, which can be implemented independently of the first aspect, consists in that external units such as infrastructural devices and adjacent vehicles transmit position data to the vehicle and these data are evaluated and processed for determining the position of the vehicle (possibly only from these).

According to a further exemplary embodiment of the invention, the external position data are used for improving an accuracy of the position of the vehicle determined by the position determination unit.

According to a further exemplary embodiment of the invention, information regarding an accuracy of the external position data is utilized for calculating the position of the vehicle.

According to a further exemplary embodiment of the invention, a driver assistance system with a position determination device described above and in the text which follows is specified.

According to a further exemplary embodiment of the invention, an emergency call device with a position determination device described above and in the text which follows is specified.

According to a further exemplary embodiment of the invention, a vehicle with a position determination device described above and in the text which follows is specified.

According to a further exemplary embodiment of the invention, a method for position determination for a vehicle is specified in which a position of the vehicle is determined, validation data are received (from an external place) and a validation of the position determined by the position determination unit is carried out on the basis of the received validation data.

According to a further exemplary embodiment, the first method step (determining a position of the vehicle) can be omitted. In this case, only the "validation data" are received from the external transmitters and the vehicle position is calculated from these.

According to a further exemplary embodiment of the invention, a program element is specified which, when it is executed on a processor of a position determination device, directs the processor to carry out the steps described above and in the text which follows.

According to a further exemplary embodiment of the invention, a computer-readable medium is specified on which a program element is stored which, when it is executed on a processor, directs the processor to carry out the steps described above and in the text which follows.

The program element can be, for example, a part of a software which is stored on the processor. As well, the program element can use the invention already from the beginning or can be caused to use the invention by an update.

In the text which follows, exemplary embodiments of the invention will be described with reference to the figures.

BRIEF DESCRIPTION OF THE DRAWINGS

The invention is best understood from the following detailed description when read in connection with the accompanying drawings. Included in the drawings is the following figures.

DETAILED DESCRIPTION OF THE PREFERRED EMBODIMENTS

The illustrations in the figures are in diagram form and are not to scale.

In the description of the figures following, identical reference numbers are used for identical or similar elements.

Figure 1:
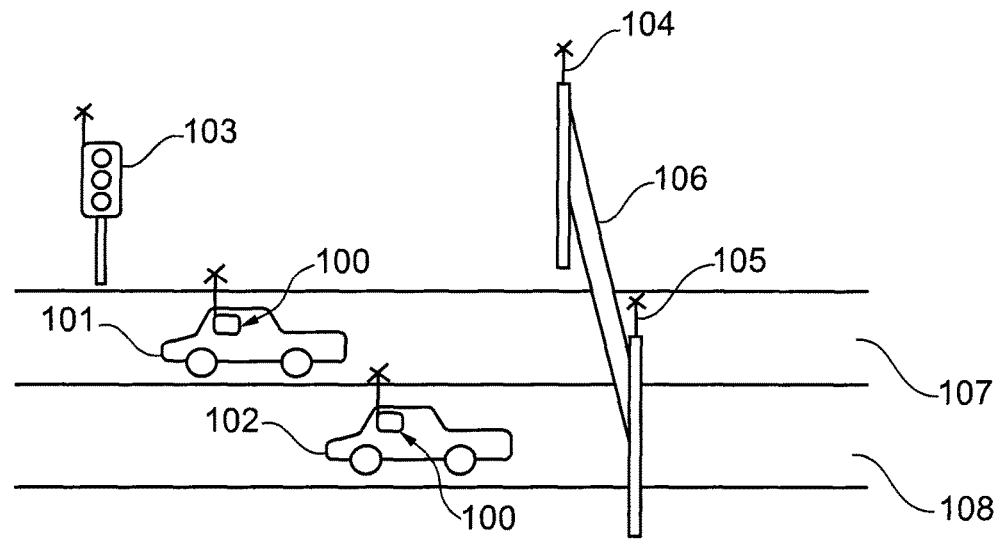
FIG. 1 shows two vehicles and two infrastructural devices according to an exemplary embodiment of the invention.

FIG. 1 shows two vehicles 101, 102 which in each case have one position determination device 100. The first vehicle 101 is moving on a left-hand traffic lane 107 and the second vehicle 102 is moving on a right-hand traffic lane 108.

Furthermore, a traffic light system 103 is provided which has a communication device. Furthermore, signposting 106 is provided which has a first infrastructural device 104 at the left-hand traffic lane edge and a second infrastructural device 105 at the right-hand traffic lane edge. The infrastructural devices 104 and 105 can also be implemented as one unit which, however, can support both traffic lanes 107 and 108. The two infrastructural devices 104, 105 and the traffic light system 103 know their own position and can convey these own positions to the vehicles 101, 102, for example together with information about how this position information is to be used by the vehicle, for example what accuracy it has.

This "accuracy information" depends on how accurately the correlation between the actual position of the receiving vehicle and the location of the transmitter 103, 104, 105 can be determined. If the vehicles can only receive the position information of the left-hand transmitter 104, for example, when they are located directly under the signposting 106 and are driving in the left-hand traffic lane 107, this statement of information can be graded as "very accurate". If a vehicle can also only receive the position information transmitted by the right-hand transmitter 105 when it is directly located under the signposting 106 and in the right-hand traffic lane 108, this position information, too, is graded as "very accurate".

The greater the possible area in which a vehicle can be located when it receives the corresponding position information, the greater this information will be identified as being "more inaccurate".

Figure 2:
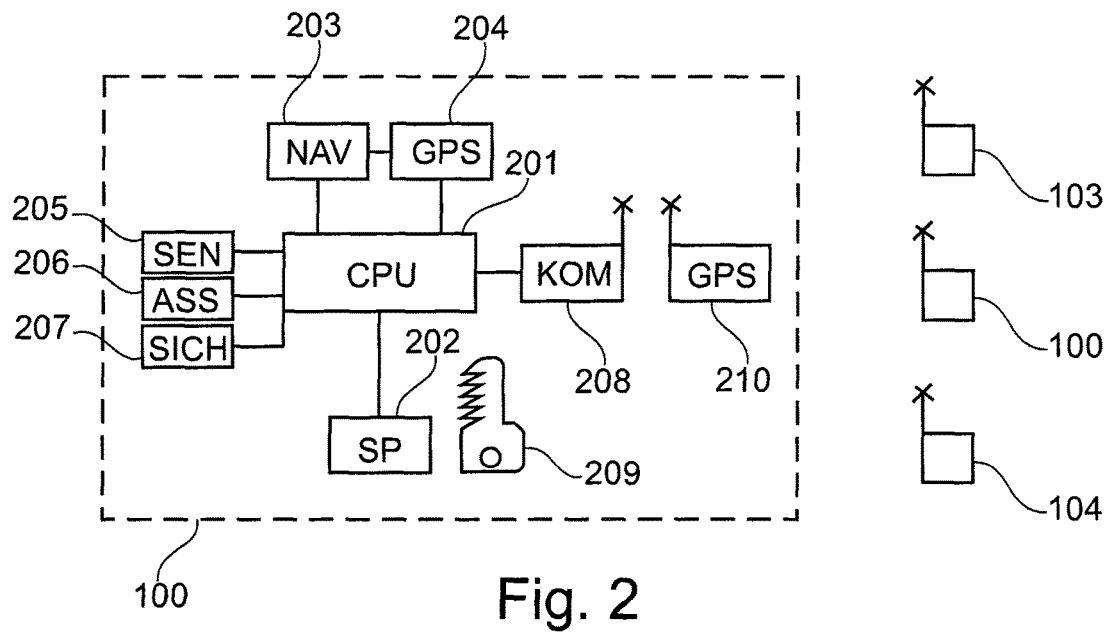
FIG. 2 shows a position determination device and a number of external transmitters according to a further exemplary embodiment of the invention.

FIG. 2 shows a position determination device 100 which can be used by such a vehicle. The position determination device 100 has a central control unit 201 to which a number of components are connected, which is coupled to a number of components in a communicating manner. This coupling can also be cableless.

For example, a memory unit 202 is connected to the control unit 201, on which memory unit a digital map is stored. Furthermore, a satellite navigation receiver 204 and a navigation module 203 are provided which are connected both to the control unit 201 and directly to one another.

Furthermore, the position determination device 100 has a vehicle sensor system 205 which can have environmental sensors and other sensors, for example ESP sensors. The vehicle position data determined by the position determination device 100 can then be used by a driver assistance system 206 and/or a safety system 207.

A communication unit 208 is provided for receiving the validation data. As an alternative for, or additionally thereto, a wireless access and drive authorization unit 209 can be provided. It is also possible that a mobile satellite navigation receiver 210 is provided in the vehicle.

The external units 100 (which are installed in an adjacent vehicle) and the infrastructural devices 103, 104 transmit validation data and position data to the communication devices 208, 209.

In other words, additional positions are thus received via vehicle-to-infrastructure communication and/or vehicle-to-vehicle communication. The position of the vehicle itself can be received, for example, via a mobile telephone and transmitted by means of short-range communication (e.g. Bluetooth) to the control unit. To avoid any misuse of data (hacker attack), the data transmitted cablelessly can be encrypted.

The wireless access and drive authorization unit 209 receives the data of the external sources 100, 103, 104 and thus assists, for example, in the delivery of an automated emergency call (eCall) via a mobile telephone 210. To validate the position data, field strength information of the received signals can also be used.

For example, the position data are only transmitted when they are validated. For example, the position data can be transmitted between the individual vehicles via the keys 209.

In previously known systems, it is often not possible to improve the vehicle position determination or to determine it with sufficient quality if the conditions at the location of reception do not allow any better positioning or if a fault occurs in the receiver. According to one exemplary embodiment of the invention, a standard satellite navigation signal is validated. In other words, it is determined whether the position measured by means of GPS sensors is at least theoretically possible in the current situation, that is to say is plausible. For this purpose, the positions of other vehicles are received by means of vehicle-to-X- ("X" standing for "vehicle" or "infrastructure") communication and compared with one's own position. From this, it is determined how probable the position measured with one's own GPS receiver is. In this context, the approximate range of the communication etc. provide helpful information.

It is only due to this validation that safety systems based on or assisted by GPS are possible since validation of the essential sensor data is always required here.

By using positions from the environment which are transmitted by radio, the additional hardware expenditure in the vehicle is low since the necessary hardware is already provided because it is already used for other functions. In addition, measuring problems which are attributable to one's own location can be compensated by the device described.

In the text that follows, a further exemplary embodiment is described in detail:

In the case of vehicle-to-X communication, the position of the transmitter is mandatorily always also transmitted. As a result, a vehicle-to-X receiver typically receives a number of positions within its range of reception. Using this information, the signal delivered by one's own GPS receiver can be validated and/or improved.

This validation is also important on the other paths in order to check whether a received position can be correct. If one of the received positions does not match the other received positions and not one's own determined position, either, this wrong position can be filtered out. This is a first step for preventing, or at least making more difficult, data misuse (for example in the form of hacker attacks, i.e. delivering false messages with the aim of taking advantages). In the case of these hacker attacks, it is additionally sensible to validate the position with the dynamic data, that is to say infer the probable position from the speed and the last position and to compare this with the received position.

The validation is also of importance when the GPS position has been transmitted by an unknown or relatively insecure device 210 such as, e.g. a mobile device which is linked to the control unit 201 by interface (Bluetooth, USB, etc.). This is the case, for example, with an eCall via a mobile device. If the vehicle is equipped with vehicle-to-X communication, the position of one's own vehicle can be validated and, if necessary, position information can be transmitted about a region if, e.g., no sensible position can be determined currently at one's own location.

In this context, vehicle-to-X communication does not have to be implemented via DSRC or the WLAN 802.11p standard. In particular, a wireless drive authorization unit 209 can be used for sending out and receiving vehicle-to-X messages. This technique is especially helpful also to validate the eCall position since no expensive extra hardware has to be installed in the vehicle in addition to the eCall module.

If the GPS position is determined via a mobile device in vehicle-to-X communication, it can be provided that the position of this mobile device is sent out only when it has been validated by the methods described above.

In this context, "sending out" is understood to mean that the position is transmitted to adjacent vehicles or the vehicle-internal control unit 201.

In addition to the received position, it can be provided that the field strength is measured with which the "external" messages are received. This makes it possible to additionally improve the validation of the position. If the field strength is maximum, for example, it can be assumed that the external transmitter is in the immediate vicinity of the vehicle.

Incidentally, it can also be provided that a number of GPS receivers can be provided in the vehicle which mutually validate each other.

In the text which follows, the second aspect of the invention (improvement of the positioning via infrastructure-based systems and information) is explained further:

Commercially available GPS receivers as used in vehicles often supply only a limited accuracy. This may not be sufficient for finding out, e.g. in which lane of a road a vehicle is located. This often requires much more elaborate and thus much more expensive devices.

According to the second aspect of the invention, the vehicle position determination can now be improved. The position of elements of the infrastructure (traffic light systems, signposting systems etc.) does not normally change and can therefore be surveyed with high accuracy. This accurate position including the precise time of transmission to the vehicle is used for improving the accuracy of the position determination in the vehicle. In addition, the positions of a number of systems (adjacent vehicles and/or infrastructural devices) can be used at the same time in order to improve the accuracy further by this means. In this context, a statistical or a fuzzy logic approach can be used.

The positions of the different position sources are supplied with partially differing accuracy. In this context, each position source sends the accuracy of the position determination (which, for example, can be dependent on the size of the area of reception). If it is detected that a position source supplies a deviating position from the majority of the other position sources, the accuracy of the deviating position source is diminished and thus its influence reduced.

In order to further improve the positioning, a history of the position determination can be used. Thus, the accuracy of the individual position sources is stored, as is whether there has been a degrading of the accuracy in this position source in the past. It is thus more possible to evaluate the current accuracy of the position supplied.

In the short term, the course of the positioning can also be stored in order to be able to use position corrections arriving with a delay (e.g. due to signal propagation times on the communication channel) for correcting the current position. For example, the lane allocation of the vehicle can be corrected by means of a lane association reported with delay.

Possible position sources can be:
toll bridges which recognize the lane association and position of the vehicle and its license number and report the lane association to the vehicle by radio.
Traffic cameras determine the position of the vehicle and its license number and report the position to the vehicle by radio.
The vehicle drives over an induction loop and the lane association and the position is thereupon transmitted to it by the loop.
The vehicle receives the position via a transponder in the ground.
The vehicle receives the position via a transponder in a traffic sign.
Other vehicles or objects (e.g. pedestrians) supply their own position and the vehicle itself recognizes the relevant position to this supplied position by means of environmental sensors. Merged together, this results in an absolute position.

The different position sources 100 (adjacent vehicle), 103, 104 can determine their position via different methods. Examples of these are GNSS, like GPS or DGPS, Galileo, Waas and Egnos. As well, "dead reckoning" can be carried out in the vehicle or object. The latter method is, e.g., compound navigation, that is to say the continuous determination of location by measuring course, speed and time. However, corrections based on yaw rate and/or wheel speed numbers also come under the term "dead reckoning".

Further examples are the position determination via cell membership in the mobile radio network, and the position determination via cell membership in the WLAN hot spot network.

By means of the various methods, it is possible to determine the position even when no satellite reception is possible.

By using external position sources and external position determination, it is possible to determine the position of the vehicle more accurately. By means of statistical methods or fuzzy logic, it is possible to merge a number of position sources with different accuracies (which are transmitted by the position source). By comparing the position with other sources and devaluing the accuracy in the case of deviations and storing this accuracy for historic evaluations, the accuracy of position can be improved further with time.

According to the second aspect of the invention, external position sources are thus used for improving the position of the vehicle itself. The accuracy of the positioning is transmitted with every position source. The received data can be evaluated and there is possibly a degrading of the accuracy of a position source by comparison with other position information from other position sources. The accuracy of positioning with respect to each position source (including possible devaluations) can be stored in order to improve future positioning accuracy. Furthermore, the positioning can be stored in the short term in order to be able to carry out corrections even in the case of time-delayed position information.

Figure 3:
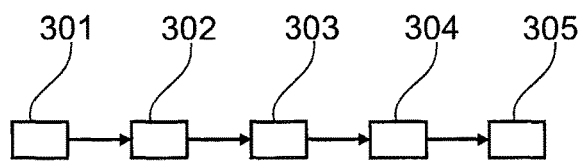
FIG. 3 shows a flow chart of a method according to an exemplary embodiment of the invention.

FIG. 3 shows a flow chart of a method according to one exemplary embodiment of the invention. In step 301, the vehicle position is determined by a vehicle-internal position determination unit (for example permanently installed or mobile satellite navigation receiver). In step 302, the vehicle continues to receive validation data and position data from external devices. In step 303, the received data are used for determining whether the measured position is correct or can be correct, in order to increase the accuracy of the measured position, if possible, or in order to calculate a vehicle position independently of the measured position. All this takes place in step 304. In step 305, this vehicle position is then used for initiating a digital automated emergency call. As an alternative, step 305 can also consist of using the vehicle position thus obtained for navigation, for driver assistance or for communication to an adjacent vehicle.

It should be additionally pointed out that "comprising" and "having" does not exclude any other elements or steps and "one" or "a" does not exclude a plurality. Furthermore, it should be pointed out that features or steps which have been described with reference to one of the above exemplary embodiments can also be used in combination with other features or steps of other exemplary embodiments described above.

The invention claimed is:

1. A position determination device located in a vehicle, the position determination device having:
   a position determination unit in the vehicle, including sensors and a global navigation system satellite (GNSS) receiver for determining a position of the vehicle;
   a communication unit in the vehicle, including a receiver for receiving validation data which includes position data of a plurality of adjacent vehicles or of a plurality of adjacent infrastructure devices; and
   a control unit in the vehicle, including a processor for carrying out a validation of the position determined by the position determination unit by comparing the position determined by the position determination unit to the position data included in the validation data,
   wherein the processor is configured to compare the position of the vehicle determined by the position determination unit to the position data of the adjacent vehicle or the adjacent infrastructure device included in the validation data, and
   wherein the processor is configured to:
   1) compare the position data of the plurality of vehicles or the plurality of infrastructure devices to each other, and filter out the position data from the validation data that do not match,
   2) validate the position determined by the position determination unit when the comparison between the position determined by the position determination unit and the position data included in the validation data is within a communication range indicating that the position determined by the position determination unit is probable, the validated position used by at least one of a safety system or an assistance system located in the vehicle, and
   3) invalidate the position determined by the position determination unit when the comparison between the position determined by the position determination unit and the position data included in the validation data is outside of the communication range indicating that the position determined by the position determination unit is improbable, the invalidated position filtered out and not used by the at least one of the safety system or the assistance system located in the vehicle.

2. The position determination device as claimed in claim 1,
   wherein the validation data are transmitted by vehicle-to-vehicle communication or vehicle-to-infrastructure communication.

3. The position determination device as claimed in claim 1,
   wherein the position determination unit is integrated in a mobile device.

4. The position determination device as claimed in claim 1,
   wherein the control unit resorts to measurement data of a sensor system of the vehicle for carrying out the validation of the position determined by the position determination unit.

5. The position determination device as claimed in claim 1, wherein the position determination unit comprises a satellite navigation receiver.

6. The position determination device as claimed in claim 1, wherein the position determination device is configured for initiating an automated emergency call which contains position information which is based on the received validation data if the validation has failed.

7. The position determination device as claimed in claim 1, wherein the communication unit is a wireless access and drive authorization unit.

8. The position determination device as claimed in claim 1,
   wherein the control unit is configured for calculating the position of the vehicle by using external position data which have been generated by an infrastructural device or an adjacent vehicle.

9. The position determination device as claimed in claim 8,
   wherein the external position data are used for improving an accuracy of the position of the vehicle determined by the position determination unit.

10. The position determination device as claimed in claim 8, wherein information regarding an accuracy of the external position data is utilized for calculating the position of the vehicle.

11. A driver assistance system with a position determination device as claimed in claim 1.

12. An emergency call device with a position determination device as claimed in claim 1.

13. A vehicle with a position determination device as claimed in claim 1.

14. A method for position determination for a vehicle, the method having the steps:
   determining, by a processor in the vehicle, using sensors and a global positioning system navigation (GNSS) receiver, a position of the vehicle;
   receiving, by a receiver in the vehicle, validation data which includes position data of a plurality of adjacent vehicles or of a plurality of adjacent infrastructure devices; and
   carrying out, by the processor, a validation of the position by comparing the position of the vehicle determined by the processor to the position data of the adjacent vehicle or the adjacent infrastructure device included in the validation data, by:
   1) comparing the position data of the plurality of vehicles or the plurality of infrastructure devices to each other, and filter out the position data from the validation data that do not match,
   2) validating the position determined by the processor when the comparison between the position determined by the processor and the position data included in the validation data is within a communication range indicating that the position determined by the processor is probable, the validated position used by at least one of a safety system or an assistance system located in the vehicle, and 3) invalidating the position determined by the processor when the comparison between the position determined by the processor and the position data included in the validation data is outside of the communication range indicating that the position determined by the processor is improbable, the invalidated position filtered out and not used by the at least one of the safety system or the assistance system located in the vehicle.

15. A non-transitory computer-readable medium on which a program element is stored which, when it is executed on a processor, directs the processor to carry out the following steps:

determining a position of a vehicle using sensors and a global positioning system navigation (GNSS) receiver;

receiving validation data through a receiver in the vehicle which includes position data of a plurality of adjacent vehicles or of a plurality of adjacent infrastructure devices; and carrying out a validation of the position by comparing the determined position of the vehicle to the position data of the adjacent vehicle or the adjacent infrastructure device included in the validation data, by:

1) comparing the position data of the plurality of vehicles or the plurality of infrastructure devices to each other, and filter out the position data from the validation data that do not match, 2) validating the position determined by the processor when the comparison between the position determined by the processor and the position data included in the validation data is within a communication range indicating that the position determined by the processor is probable, the validated position used by at least one of a safety system or an assistance system located in the vehicle, and 3) invalidating the position determined by the processor when the comparison between the position determined by the processor and the position data included in the validation data is outside of the communication range indicating that the position determined by the processor is improbable, the invalidated position filtered out and not used by the at least one of the safety system or the assistance system located in the vehicle.

* * * * *